(12) United States Patent
Jung et al.

(10) Patent No.: US 11,904,553 B2
(45) Date of Patent: Feb. 20, 2024

(54) METHOD FOR PRODUCING JOINED BODY OF DIFFERENT MATERIALS AND JOINED BODY OF DIFFERENT MATERIALS

(71) Applicant: LG CHEM, LTD., Seoul (KR)

(72) Inventors: Jin Mi Jung, Daejeon (KR); In Ki Min, Daejeon (KR); Yu Jin Jeong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1 day.

(21) Appl. No.: 17/256,501

(22) PCT Filed: Sep. 18, 2019

(86) PCT No.: PCT/KR2019/012048
§ 371 (c)(1),
(2) Date: Dec. 28, 2020

(87) PCT Pub. No.: WO2020/067672
PCT Pub. Date: Apr. 2, 2020

(65) Prior Publication Data
US 2021/0276306 A1    Sep. 9, 2021

(30) Foreign Application Priority Data
Sep. 28, 2018  (KR) .................. 10-2018-0115903

(51) Int. Cl.
*B29C 65/16*  (2006.01)
*B32B 3/30*  (2006.01)
(Continued)

(52) U.S. Cl.
CPC ............ *B29C 65/1635* (2013.01); *B32B 3/30* (2013.01); *B32B 15/085* (2013.01); *B32B 15/18* (2013.01);
(Continued)

(58) Field of Classification Search
CPC ............ B29C 65/1616; B29C 65/1654; B29C 65/1635; B29C 65/1641; B29C 65/167;
(Continued)

(56) References Cited

U.S. PATENT DOCUMENTS

2005/0042456 A1    2/2005  Krause et al.
2013/0192751 A1*   8/2013  Arai .................... B29C 66/3032
                                                    156/272.8
(Continued)

FOREIGN PATENT DOCUMENTS

JP    2004223837 A      8/2004
JP    2005041073 A  *   2/2005  ........... B29C 66/542
(Continued)

OTHER PUBLICATIONS ip.com translation of JP2005041073A (Year: 201).*
(Continued)

*Primary Examiner* — John L Goff, II
(74) *Attorney, Agent, or Firm* — Bryan Cave Leighton Paisner LLP (57) ABSTRACT

The present invention provides a method for producing a joined body of different materials, which may easily achieve joining between a plurality of resin layers and joining between a resin and a metal, and a joined body of different materials.

5 Claims, 6 Drawing Sheets

(51) Int. Cl.
  *B32B 15/085* (2006.01)
  *B32B 15/18* (2006.01)
  *B32B 27/16* (2006.01)
  *B32B 27/20* (2006.01)
  *B32B 27/32* (2006.01)
  *B32B 37/16* (2006.01)
  *B32B 38/00* (2006.01)
  *B32B 38/10* (2006.01)
  *B32B 37/18* (2006.01)

(52) U.S. Cl.
  CPC .............. *B32B 27/16* (2013.01); *B32B 27/20* (2013.01); *B32B 27/32* (2013.01); *B32B 37/16* (2013.01); *B32B 38/0008* (2013.01); *B32B 38/10* (2013.01); *B32B 37/182* (2013.01); *B32B 2262/101* (2013.01); *B32B 2270/00* (2013.01); *B32B 2307/414* (2013.01); *B32B 2309/105* (2013.01); *B32B 2310/0843* (2013.01); *B32B 2311/30* (2013.01); *B32B 2323/10* (2013.01)

(58) Field of Classification Search
  CPC ............ B29C 65/1674; B29C 66/0246; B29C 66/30321; B29C 66/30325; B29C 66/303; B29C 66/3032; B29C 66/3284; B32B 37/182; B32B 38/0008; B32B 38/10; B32B 2307/414; B32B 2309/105; B32B 2310/0843; B32B 2311/30; B32B 2323/10; B23K 26/21; B23K 26/324; B23K 26/364; B23K 26/386; B23K 26/57; B23K 26/60

USPC .......................................... 156/272.8, 380.9
  See application file for complete search history.

(56) References Cited

U.S. PATENT DOCUMENTS

2020/0262173 A1* 8/2020 Jung .................... B29C 66/0246
2021/0283860 A1* 9/2021 van der Straeten ........................ B29C 66/7392

FOREIGN PATENT DOCUMENTS

| | | |
|---|---|---|
| JP | 2005088355 A | 4/2005 |
| JP | 2007182003 A | 7/2007 |
| JP | 2012223889 A | 11/2012 |
| JP | 2012232531 A | 11/2012 |
| JP | 2014024225 A | 2/2014 |
| JP | 2014046599 A | 3/2014 |
| JP | 2014065288 A | 4/2014 |
| JP | 2015116684 A | 6/2015 |
| JP | 2016132131 A | 7/2016 |
| JP | 2016141092 A | 8/2016 |
| JP | 2016159578 A | 9/2016 |
| KR | 10-20180036574 A | 4/2018 |
| WO | WO-2016125594 A1 * | 8/2016 |
| WO | WO-2018062828 A2 * | 4/2018 ......... B23K 26/0622 |

OTHER PUBLICATIONS

Machine translation of WO 2016125594 date unknown.*
Machine translation of JP 2014065288 date unknown.*
Machine translation of JP 2014046599 date unknown.*
Machine translation of JP 2014024225 date unknown.*

* cited by examiner

METHOD FOR PRODUCING JOINED BODY OF DIFFERENT MATERIALS AND JOINED BODY OF DIFFERENT MATERIALS

CROSS-REFERENCE TO RELATION APPLICATIONS

The present specification is a U.S. national stage of international Application No. PCT/KR2019/012048 filed on Sep. 18, 2019, and claims the benefit of the filing date of Korean Patent Application No. 10-2018-0115903 filed with the Korean Intellectual Property Office on Sep. 28, 2018, the entire content of which is incorporated herein.

TECHNICAL FIELD

The disclosure relates to a method for producing a joined body of different materials and a joined body of different materials.

BACKGROUND

In general, joining different materials, such as joining a metal and a resin, is not easy in most cases, because the inherent physical and chemical properties and the surface states of the materials are different. Techniques that may be used for joining such different materials may be classified into bonding with adhesives, mechanical tightening, welding, insert injection, and the like. Among them, the technique that uses an adhesive has the advantage of being used in a simple manner, and thus is a typical and classic method that is most frequently used for joining different materials in electronic products.

The process that uses an adhesive or mechanical tightening allows for the joining of different materials in a relatively easy manner, but a problem arises in that a junction between the different materials is directly exposed to the outside.

In addition, in recent years, the development of heterojunction materials composed of resin-resin-metal has been in progress. In the case of such heterojunction materials, joining the resins and joining a resin and a metal are each performed separately, and thus problems arise in that the production process is complicated and the production cost increases.

Accordingly, there is a need for a technology capable of easily joining a plurality of resin layers and joining a resin and a metal using a relatively simple process.

RELATED REFERENCE

Korean Patent No. KR10-1499665

SUMMARY

The present invention provides a method for producing a joined body of different materials, which is capable of easily joining a plurality of resin layers and joining a resin and a metal, and a joined body of different materials.

However, problems to be solved by the present invention are not limited to the above-mentioned problem, and other problems which are not mentioned will be clearly understood by those skilled in the art from the following description.

An exemplary embodiment of the present invention provides a method for producing a joined body of different materials, the method including the steps of: preparing a metal substrate including two or more etched grooves on one surface thereof and burrs provided adjacent to the etched grooves; sequentially laminating a first resin layer and a second resin layer on a surface of the metal substrate, thereby producing a laminate; and irradiating the surface of the second resin layer with a laser, wherein the first resin layer has a light transmittance of 20% to 70% at any one wavelength selected from the range of 800 nm to 1,100 nm, and the light transmittance of the first resin layer at any one wavelength selected from the range of 800 nm to 1,100 nm is lower than the light transmittance of the second resin layer at the same wavelength.

Another embodiment of the present invention provides a joined body of different materials including: a metal substrate including two or more etched grooves on one surface thereof and burrs provided adjacent to the etched grooves; and a first resin layer and a second resin layer sequentially laminated on the surface of the metal substrate, wherein the first resin layer has a light transmittance of 20% to 70% at any one wavelength selected from the range of 800 nm to 1,100 nm, and the light transmittance of the first resin layer at any one wavelength selected from the range of 800 nm to 1,100 nm is lower than the light transmittance of the second resin layer at the same wavelength.

The method for producing a joined body of different materials according to an exemplary embodiment of the present invention has an advantage in that joining the resin layers and joining a resin layer and a metal substrate may be achieved simultaneously by a simple method.

The joined body of different materials according to an exemplary embodiment of the present invention may have excellent bonding strength between the metal substrate and the first resin layer and excellent bonding strength between the first resin layer and the second resin layer.

The effects of the present invention are not limited to the above-described effect, and effects which are not mentioned will be clearly understood by those skilled in the art from the present specification and the accompanying drawings.

DETAILED DESCRIPTION

Throughout the present specification, it is to be understood that when any part is referred to as "including" any component, it does not exclude other components, but may further include other components, unless otherwise specified.

Throughout the present specification, when any member is referred to as being "on" another member, it refers to not only a case where any member is in contact with another member, but also a case where a third member exists between the two members.

Throughout the present specification, it is to be understood that when any component is referred to as being "included" in any part, it is not formed by a special or limited method, but is placed or provided on any part.

As used in the present specification, the term "step of doing . . . " or "step of . . . " does not mean "a step for . . . ".

In the present specification, the thickness of any member may be measured in comparison with the corresponding scale in a scanning electron microscope (SEM; Scanning Electron Microscope S-4800, HITACHI) image of the side of the member, or may be measured using a thickness gauge.

In the present specification, the "light transmittance" of a member may mean the percentage of the amount of light transmitted through the member relative to the amount of light incident on the member. Furthermore, the "light reflectance" of a member may mean the percentage of the amount of light reflected from the member relative to the amount of light incident on the member. In addition, the "light absorption rate" of a member may mean the ratio of the amount of light absorbed by the member relative to the amount of light incident on the member, the light transmittance of a member may mean a value obtained by subtracting the light absorption rate (%) and light reflectance (%) of the member from 100%. In addition, the light transmittance, light reflectance and light absorption rate of a member may be values at a specific wavelength, measured using a spectrophotometer (SolidSpec-3700, Shimadzu).

Hereinafter, the present specification will be described in more detail.

An exemplary embodiment of the present invention provides a method for producing a joined body of different materials, the method including the steps of: preparing a metal substrate including two or more etched grooves on one surface thereof and burrs provided adjacent to the etched grooves; sequentially laminating a first resin layer and a second resin layer on the surface of the metal substrate, thereby producing a laminate; and irradiating the surface of the second resin layer with a laser, wherein the first resin layer has a light transmittance of 20% to 70% at any one wavelength selected from the range of 800 nm to 1,100 nm, and the light transmittance of the first resin layer at any one wavelength selected from the range of 800 nm to 1,100 nm is lower than the light transmittance of the second resin layer at the same wavelength.

The method for producing a joined body of different materials according to an exemplary embodiment of the present invention has an advantage in that joining between resin layers and joining between a resin layer and a metal substrate may be achieved at the same time by a simple method.

According to an exemplary embodiment of the present invention, it may be preferable to use, as the metal substrate, a material that may be easily patterned by laser irradiation and has an appropriate light absorption rate, although a conventional material may be used as the metal substrate without particular limitation. For example, pure metals such as aluminum (Al) and titanium (Ti), alloys such as stainless steel (STS), and the like may be used as the metal substrate.

According to an exemplary embodiment of the present invention, the shape of the metal substrate may be applied without particular limitation, as long as it may be etched by laser irradiation and may be smoothly joined with the resin. For example, the metal substrate may have shapes, such as cylindrical and polyhedron shapes, and may include a flat surface and a curved surface.

According to an exemplary embodiment of the present invention, a laser (hereinafter referred to as the first laser) may be irradiated onto a surface of the metal substrate, thereby preparing a metal substrate including two more etched grooves and burrs provided adjacent to the etched grooves.

According to an exemplary embodiment of the present invention, the first laser may be a pulse laser having a wavelength of 1,064 nm. In addition, the output of the first laser may be 20 W to 200 W, specifically 20 W to 100 W, 20 W to 50 W, or 20 W to 40 W.

According to an exemplary embodiment of the present invention, the repetition frequency of the first laser may be 30 kHz to 600 kHz, specifically 30 kHz to 200 kHz, 40 kHz to 600 kHz, or 40 kHz to 200 kHz.

In the present specification, the repetition frequency of the first laser may mean the number of cycles per second of the pulse laser.

According to an exemplary embodiment of the present invention, the scanning speed of the first laser may be 100 mm/s to 1,000 mm/s, specifically 100 mm/s to 400 mm/s, 200 mm/s to 1,000 mm/s, 200 mm/s to 400 mm/s, 200 mm/s to 450 mm/s, 300 mm/s to 400 mm/s, or 300 mm/s to 450 mm/s.

In the present specification, the scanning speed of the pulse laser may mean a speed at which the laser irradiated moves from one point to another point.

According to an exemplary embodiment of the present invention, the number of irradiations of the first laser may be 1 to 10, specifically 1 to 8, 1 to 4, 2 to 10, 2 to 8, 2 to 4, or 4 to 8. In addition, the pulse width of the first laser may be 15 ns to 220 ns.

According to an exemplary embodiment of the present invention, the spot size of the first laser may be 15 μm to 50 μm, specifically 25 μm to 50 μm, 30 μm to 50 μm, or 35 μm to 50 μm.

In the present specification, the spot size (or beam size) may mean the maximum distance from one end to the other end of the focal point of the pulse laser.

According to an exemplary embodiment of the present invention, the peak output of the first laser may be 1.5 kW to 6 kW, specifically 1.5 kW to 3.4 kW, 1.9 kW to 6 kW, or 1.9 kW to 3.4 kW. In addition, the pulse energy of the first laser may be 0.1 mJ to 2 mJ, specifically 0.1 mJ to 1 mJ, 0.5 mJ to 2 mJ, or 0.5 mJ to 1 mJ.

When conditions for irradiating a surface of the metal substrate with the first laser are adjusted as described above, the depth of the etched groove, the inlet width of the etched groove, the middle width of the etched groove, the length of the burr, the height of the burr, and the range of the angle formed between the burr and the surface of the metal substrate may be controlled as described below. Accordingly, it is possible to increase the bonding strength between the metal substrate and the first resin layer.

According to an exemplary embodiment of the present invention, under the energy conditions of the first laser, the material evaporated from the wall of the etched groove and the inlet of the etched groove may be re-condensed, and the burr protruding from the metal substrate may be relatively roughly formed. Accordingly, it is possible to easily form an area, in which the metal substrate and the first resin layer may be joined, and an anchoring structure.

According to an exemplary embodiment of the present invention, the surface of the metal substrate may be irradiated with the first laser in the depth direction of the etched groove, and as a result, a portion of the metal substrate may be melted in a direction away from the central axis of the etched groove on the surface of the metal substrate and may have the burrs. In addition, the remaining portion of the metal substrate other than the portion having the burrs may be melted toward the central axis of the etched groove in the metal substrate having the etched groove formed therein by irradiating with the first laser. Accordingly, it is possible to form an etched groove having a relatively narrow inlet width.

Specifically, as a result of irradiating the surface with the first laser, melting of the metal substrate may proceed rapidly. Then, as the focus of the first laser moves, the melted metal substrate may be cooled, and an etched groove having a relatively narrow inlet width compared to the middle width may be formed as the melted metal substrate is cooled at a portion adjacent to the etched groove.

According to an exemplary embodiment of the present invention, in the process of irradiating a surface of the metal substrate with the first laser, etched grooves may be formed on the surface of the metal substrate along the traveling direction of the first laser. That is, the traveling direction of the first laser may coincide with the progress direction of the etched groove.

In addition, a surface of the metal substrate may be irradiated with two or more first lasers, and the traveling directions of the two or more first lasers may intersect. Specifically, the traveling direction of one of the first lasers and the traveling direction of another first laser may intersect. When a surface of the metal substrate is etched by irradiation the two or more first lasers a lattice structure may be formed with burrs protruding from the surface of the etched metal substrate may be formed adjacent to the etched grooves on the surface of the metal substrate so as to protrude away from the etched grooves.

According to an exemplary embodiment of the present invention, an micrometer-sized etched groove may be formed on a surface of the metal substrate by irradiating the metal substrate with the first laser, and at the same time, burrs may be formed adjacent to the etched groove extending in a direction away from the groove. In addition, since the etched groove may be formed along the traveling direction of the first laser, burrs adjacent to each of the etched grooves formed along the traveling direction of one of the first lasers and the etched groove formed along the traveling direction of another first laser may continuously extend to face each other, and finally, a fence shape composed of four sides and having a space therein may be formed. Specifically, one of the burrs adjacent to one of the etched grooves and one of the burrs adjacent to another etched groove may continuously extend to face each other, and a pair of facing burrs formed along the traveling direction of another first laser may be connected to the other burrs, respectively, thereby forming a fence shape having a space therein.

According to an exemplary embodiment of the present invention, the progress direction of a first etched groove and the progress direction of a second etched groove may be parallel to each other. In addition, the progress direction of the first etched groove and the progress direction of the second etched groove may intersect at right angles or at non-right angles.

Figure 1A:
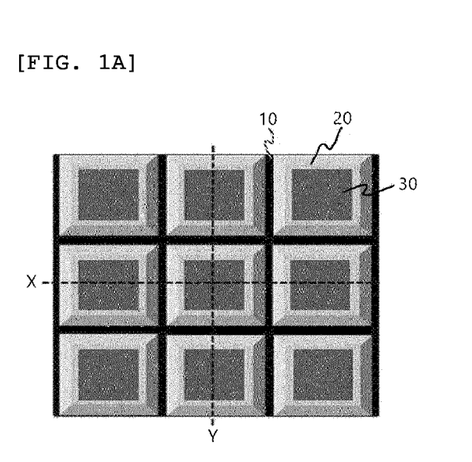
FIG. 1A is a plan view of the surface of a metal substrate etched according to an exemplary embodiment of the present invention and FIG. 1B is a scanning electron microscope (SEM) image of the metal substrate.
Figure 1B:
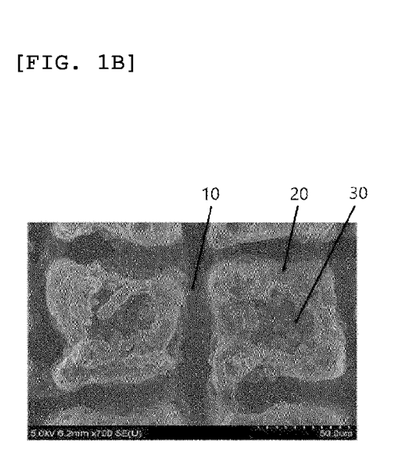

FIG. 1A is a plan view of the surface of a metal substrate etched according to an exemplary embodiment of the present invention and FIG. 1B is a scanning electron microscope (SEM) image of the metal substrate.

As illustrated in FIG. 1A, when the progress direction X of one etched groove 10 and the progress direction Y of another etched groove 10 intersect at right angles, burrs 20 extending in a direction away from the etched grooves may be provided continuously or discontinuously along the progress directions X and Y of the etched grooves 10, and a surface area 30 surrounded by the burrs 20 may be provided in a square or rectangular shape.

In addition, as shown in the SEM image in FIG. 1B, the surface of the metal substrate may be in the form of a lattice structure. Specifically, the lattice structure may be a structure formed by the intersection of an etched groove 10 having a progress direction X with an etched groove 10 having a progress direction Y (specifically, intersecting at right angles).

As described above, as the pattern is formed in a lattice structure on a surface of the metal substrate by the one etched groove and the other etched groove, the light reflectance of the surface of the metal substrate may be adjusted to an appropriate level. Accordingly, the surface of the metal substrate and the first resin layer may be joined more easily, and the bonding strength therebetween may be increased.

Figure 2:
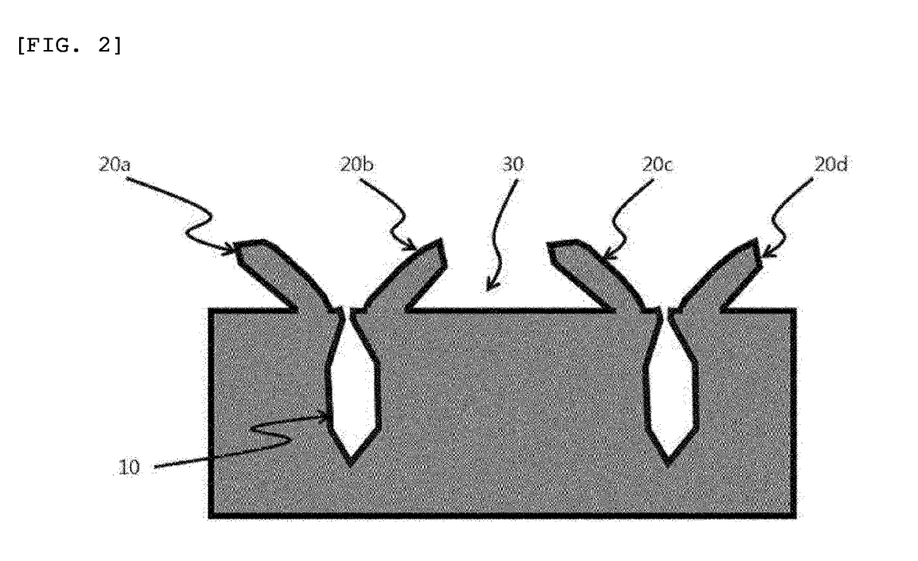
FIG. 2 is a sectional view of a metal substrate according to an exemplary embodiment of the present invention.

FIG. 2 is a side sectional view of a metal substrate according to an exemplary embodiment of the present invention.

As illustrated in FIG. 2, the surface of the metal substrate may have micrometer (μm)-sized etched grooves 10, and simultaneously, have burrs 20a and 20b provided adjacent to the etched grooves and extending in a direction away from the etched grooves. In addition, as illustrated in FIG. 2, the burrs may be provided on the surface of the metal substrate so as to protrude from the surface of the metal substrate, and the burrs may be provided to protrude away from the etched groove.

In addition, as shown in FIGS. 1A, 1B and 2, the burr 20b provided adjacent to the one etched groove 10 on the surface of the metal substrate and a burr 20c provided adjacent to the other etched groove 10 on the surface of the metal substrate may continuously or discontinuously extend to face each other, and finally, a fence shape composed of four sides and having the space 30 therein may be provided.

Furthermore, as illustrated in FIG. 2, a burr 20b adjacent to a first etched groove 10 provided on the metal substrate according to an exemplary embodiment of the present invention, and a burr 20c adjacent to a second etched groove 10, may continuously or discontinuously extend to face each other, and a pair of facing burrs (not shown) provided along the progress direction of the other etched groove, and a pair of opposing protrusions (not shown) are connected to the burrs indicated by 20b and 20c, respectively, thus forming a fence shape having the surface area 30 formed therein.

In addition, when the progress direction of one etched groove and the progress direction of another etched groove intersect at right angles, the sectional shape in the progress direction of the two etched grooves may be very similar. However, when the progress direction of one etched groove and the progress direction of another etched groove intersect at non-right angles, the sectional shape in the progress direction of the two etched grooves may be different.

According to an exemplary embodiment of the present invention, the burrs may be provided at an acute angle with respect to a surface of the metal substrate. Specifically, an angle formed between the burrs extending in a direction away from the etched grooves and the surface of the metal substrate may be an acute angle.

According to an exemplary embodiment of the present invention, the angle of the burrs with respect to the surface of the metal substrate may be 30° to 80°, 30° to 70°, 35° to 80°, 35° to 70°, 35° to 60°, 40° to 70°, or 40° to 60°. When the angle of the burrs with respect to a surface of the metal substrate is adjusted within the above range, the light reflectance of the surface of the metal substrate may be effectively lowered, and thus the surface of the metal substrate and the first resin layer may be joined more easily.

In the present specification, the angle formed between the burrs and the surface of the metal substrate may mean an angle formed between the burrs extending in a direction away from the etched grooves and the surface of the metal substrate.

According to an exemplary embodiment of the present invention, the ratio of the depth of the etched groove to the inlet width of the etched groove may be 1:3 to 1:14, or 1:3 to 1:13. In this range, the etched groove may be sufficiently filled with the first resin layer, and thus the bonding strength between the metal substrate and the first resin layer may increase.

In the present specification, the inlet width of the etched groove may mean the width of the etched groove on an extension line of the surface of the metal substrate on which the etched groove is formed.

In the present specification, the depth of the etched groove may mean the maximum distance from the lowest point of the etched groove to the intersection between the extension line of the metal substrate and the central axis of the etched groove.

According to an exemplary embodiment of the present invention, the inlet width of the etched groove may be 10 μm to 25 μm, or 10 μm to 20 μm. In addition, the depth of the etched groove may be 50 μm to 250 μm, 50 μm to 240 μm, 60 μm to 250 μm, or 60 μm to 240 μm.

Furthermore, according to an exemplary embodiment of the present invention, the middle width of the etched groove may be 15 μm to 30 μm, or 20 μm to 30 μm, and the ratio of the middle width of the etched groove to the inlet width of the etched groove may be 1:1.3 to 1:3. In these ranges, the etched groove may be sufficiently filled with the resin layer, and thus the bonding strength between the metal substrate and the first resin layer may increase.

In the present specification, the middle width of the etched groove may mean a maximum distance between the etched grooves at a point corresponding to half the depth of the etched grooves.

According to an exemplary embodiment of the present invention, when the inlet width, middle width and depth of the etched groove are adjusted within the above-described ranges, the light reflectance of the surface of the metal substrate may be controlled within an appropriate range so that the bonding strength between the surface of the metal substrate and the first resin layer may be effectively increased.

According to an exemplary embodiment of the present invention, the length from one end to other end of the burr may be 25 μm to 80 μm, 25 μm to 70 μm, 30 μm to 80 μm, 30 μm to 70 μm, 30 μm to 50 μm, 35 μm to 70 μm, or 35 μm to 50 μm.

In addition, according to an exemplary embodiment of the present invention, the height of the burr may be 30 μm to 100 μm, 30 μm to 90 μm, 40 μm to 100 μm, 40 μm to 90 μm, 40 μm to 80 μm, 50 μm to 90 μm, or 50 μm to 80 μm.

In the above-described ranges of the length of the burr and the height of the burr, the first resin layer may be sufficiently supplied and fixed to the metal substrate with sufficient bonding strength.

According to an exemplary embodiment of the present invention, the distance between the central axes of the etched grooves may be 50 μm to 1,000 μm, 50 μm to 800 μm, 80 μm to 1,000 μm, 80 μm to 800 μm, 80 μm to 500 μm, 100 μm to 500 μm, 80 μm to 250 μm, or 100 μm to 250 μm.

In this distance range, it is possible to prevent the facing burrs from being merged with each other, thereby preventing the formation of an empty space where the resin layer may not be supplied. In addition, it is possible to relatively increase the area of joining between the structure formed by the etched grooves and the burrs and the resin layer, thereby providing a sufficient bonding strength therebetween.

In the present specification, the distance between the central axes of the etched grooves may mean the distance from the end of one etched groove, at which the depth of the etched groove reaches the maximum value, to the end of the other etched groove.

According to an exemplary embodiment of the present invention, the bonding strength between the metal substrate and the first resin layer may become stronger as the height of the burr increases and the distance between the etched grooves decreases.

According to an exemplary embodiment of the present invention, a surface of the metal substrate may be modified using a method of subjecting the surface of the metal substrate to sandblast treatment and/or chemical corrosion treatment, in addition to a method of modifying the surface of the metal substrate by irradiating the first laser onto the surface of the metal substrate to form etched grooves and burrs. As the surface of the metal substrate is modified, the light reflectance of the surface of the metal substrate at any one wavelength selected from the range of 800 nm to 1,100 nm may be adjusted to a light reflectance of 10% to 30%. Accordingly, the joined body of different materials may be more easily produced.

According to an exemplary embodiment of the present invention, a joined body of different materials in which a first resin layer and a metal substrate are joined to each other and the first resin layer and a second resin layer are joined to each other may be produced by sequentially laminating the first resin layer and the second resin layer on a surface of the metal substrate to produce a laminate, and irradiating the surface of the second resin layer with a laser (hereinafter referred to as the second layer).

Figure 3:
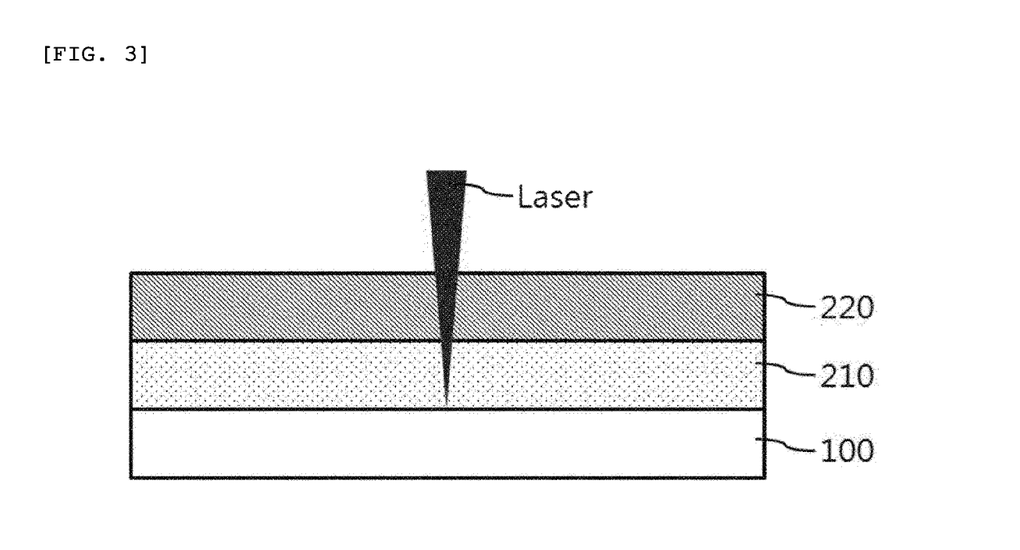
FIG. 3 is a schematic illustration of a method for producing a joined body of different materials according to an exemplary embodiment of the present invention.

FIG. 3 is a schematic illustration of a method for producing a joined body of different materials according to an exemplary embodiment of the present invention. FIG. 3 does not include an illustration of the etched grooves and burrs provided on one surface of the metal substrate.

As illustrated in FIG. 3, for a laminate in which a first resin layer 210 is provided on a surface of a metal substrate 100 and a second resin layer 220 is provided on a surface of the first resin layer 210, the laminate may be irradiated with a second laser in a direction from the second resin layer 220 to the metal substrate 100, thereby producing a joined body of different materials.

According to an exemplary embodiment of the present invention, when the laminate is irradiated with the second laser in a direction from the second resin layer to the metal substrate, the second laser may pass through the second resin layer and the first resin layer and reach the surface of the metal substrate.

In the process during which the second laser reaches the surface of the metal substrate from the second resin layer, the first resin layer and the second resin layer may be fused and joined to each other by the heat energy generated by the laser and absorbed by the second resin layer and the first resin layer, the heat energy reflected from the surface of the metal substrate and re-absorbed by the first resin layer, and the heat energy transferred from the surface of the metal substrate. In addition, the metal substrate and the first resin layer may be joined to each other while the first resin layer may be melted to fill the inside of the etched grooves formed on the surface of the metal substrate. Specifically, as the first resin layer is melted, it may be supplied to the surface of the metal substrate, the etched grooves and the inner spaces of the fence-shaped burrs, thereby achieving joining between the metal substrate and the first resin layer, that is, between different materials.

According to an exemplary embodiment of the present invention, at any one wavelength selected from the range of 800 nm to 1,100 nm, the light transmittance of the first resin layer may be 20% to 70%, and the light transmittance of the first resin layer may be lower that the light transmittance of the second resin layer. In this case, the second laser may pass through the first resin layer and the second resin layer and effectively reach the surface of the metal substrate, and the metal substrate may be joined to the first resin layer and the first resin layer may be joined to the second resin at the same time by the heat energy generated as the second laser reaches the surface of the metal substrate through the first and second resin layers.

According to an exemplary embodiment of the present invention, the light transmittance of the first resin layer at any one wavelength selected from the range of 800 nm to 1,100 nm may be 20% to 70%. Specifically, the light transmittance of the first resin layer at any one wavelength selected from the range of 800 nm to 1,100 nm may be 25% to 65%, 30% to 60%, or 35% to 65%. More specifically, the light transmittance of the first resin may be for a light having a wavelength of 915 nm.

When the light transmittance of the first resin layer is adjusted within the above-described range, the second laser may easily reach the surface of the metal substrate, and the first resin layer may effectively absorb heat energy in the process during which the second laser reaches the surface of the metal substrate. Accordingly, the first resin layer may be joined to the second resin layer and the first resin layer may be joined to the metal substrate simultaneously.

According to an exemplary embodiment of the present invention, the light absorption rate of the first resin layer at any one wavelength selected from the range of 800 nm to 1,100 nm may be 20% to 50%. Specifically, the light absorption rate of the first resin layer at any one wavelength selected from the range of 800 nm to 1,100 nm may be 25% to 45%, or 30% to 40%. More specifically, the light absorption rate of the first resin layer may be for a light having a wavelength of 915 nm.

When the light absorption rate of the first resin layer is adjusted within the above-described range, in the process during which the second laser reaches the one surface of the metal substrate, the first resin layer may effectively absorb energy from the second laser, and effectively absorb energy reflected from the one surface of the metal substrate. Accordingly, the first resin layer may be joined to the second resin layer and the first resin layer may be joined to the one surface of the metal substrate.

That is, the first resin layer may function as both a light transmitting material and a light absorbing material. According to an exemplary embodiment of the present invention, the light reflectance of the surface of the metal substrate at any one wavelength selected from the range of 800 nm to 1,100 nm may be 50% or less. Specifically, the light reflectance of the surface of the metal substrate at any one wavelength selected from the range of 800 nm to 1,100 nm may be 10% to 50%, 15% to 45%, 20% to 35%, 12.5% to 27.5%, 15% to 25%, or 17% to 23%. More specifically, the light reflectance of the surface of the metal substrate may be for a light having a wavelength of 915 nm.

When the light reflectance of the surface of the metal substrate is within the above-described range, the second laser that has reached the surface of the metal substrate may be reflected to the first resin layer at a suitable level, thereby transferring heat energy to the first resin layer, and at the same time, the first resin layer at the interface (at which the surface of the metal substrate is in contact with the first resin layer) may be effectively melted by the heat converted from the energy of the second laser absorbed by the surface of the metal substrate. Accordingly, the first resin layer portion located at the interface with the surface of the metal substrate may be effectively melted, and the melted resin may be easily supplied to the surface of the metal substrate, the etched grooves and the inner spaces of the fence-shaped burrs.

According to an exemplary embodiment of the present invention, the light transmittance of the second resin layer at any one wavelength selected from the range of 800 nm to 1,100 nm may be 50% to 80%. Specifically, the light transmittance of the second resin layer at any one wavelength selected from the range of 800 nm to 1,100 nm may be 55% to 75%, 65% to 78%, 67.5% to 75%, or 70% to 73%. More specifically, the light transmittance of the second resin layer may be for a light having a wavelength of 915 nm.

When the light transmittance of the second resin layer is within the above-described range, the energy derived from the second laser may be prevented from being concentrated at the second resin layer, thereby effectively preventing the energy from being insufficiently transferred to the first resin layer and the metal substrate.

According to an exemplary embodiment of the present invention, the thickness of the first resin layer may be 0.1 mm to 5 mm. Specifically, the thickness of the first resin layer may be 0.5 mm to 4.5 mm, 1.0 mm to 4.0 mm, 1.5 mm to 4.5 mm, 2 mm to 4 mm, or 3 mm to 3.5 mm. When the thickness of the first resin layer is adjusted within the above-described range, it is possible to increase the efficiency of joining the first resin layer and the second resin layer and the efficiency of joining the first resin layer and the surface of the metal substrate. In addition, when the thickness of the first resin layer is within the above-described range, the first resin layer itself may constitute a component of the joined body of different materials.

According to an exemplary embodiment of the present invention, as the first resin layer, any resin layer that is used in the art may be used without limitation as long as it satisfies the above-described light transmittance and light absorption rate. In addition, as the second resin layer, any resin layer that is used in the art may be used without limitation as long as it satisfies the above-described light transmittance. For example, each of the first resin layer and the second resin layer may include at least one of polypropylene resin, polyamide resin, polycarbonate resin, polybutylene terephthalate, polyethylene terephthalate, and a resin containing a reinforcing material, but the kind thereof is not limited thereto.

In addition, the reinforcing material may include at least one of glass fiber, talc, and carbon fiber, but the kind of the reinforcing material is not limited thereto.

According to an exemplary embodiment of the present invention, the laser (the second laser) may be a diode laser having an output of 50 W to 2,000 W. The diode laser may mean a laser generated by using a forward semiconductor junction as an active medium.

According to an exemplary embodiment of the present invention, the wavelength of the second laser may be a wavelength in the near infrared range. Specifically, the wavelength of the second laser may be any one wavelength selected from the range of 800 nm to 1,100 nm, specifically 915 nm.

According to an exemplary embodiment of the present invention, the output of the second laser may be 50 W to 2,000 W, and may be appropriately adjusted depending on the spot size of the laser, the material of the first resin layer and the material of the second resin layer.

According to an exemplary embodiment of the present invention, the laser (the second laser) may have a spot size of 100 μm to 5,000 μm, and the laminate may be irradiated three times or less with the second laser at an irradiation speed of 10 mm/s to 1,000 mm/s.

According to an exemplary embodiment of the present invention, the spot size of the second laser may be 200 μm to 4,500 μm, 500 μm to 3,500 μm, 750 μm to 2,000 μm, or 1,000 μm to 1,500 μm, and may be appropriately adjusted depending on the material of the first resin layer and the material of the second resin layer. In addition, the scanning speed of the second laser may be 50 mm/s to 800 mm/s, 70 mm/s to 500 mm/s, or 100 mm/s to 250 mm/s, and may be appropriately adjusted depending on the material of the first resin layer and the material of the second resin layer.

According to an exemplary embodiment of the present invention, the number of times the laminate is irradiated with the second laser may be 3 or less, specifically 2 or less. That is, the method for producing a joined body of different materials according to an exemplary embodiment of the present invention may easily join the metal substrate and the first resin layer and join the first resin layer and the second resin layer even though the number of irradiations of the second laser is small.

In addition, the method for producing a joined body of different materials according to an exemplary embodiment of the present invention does not cause problems, such as environmental pollution due to chemical hazardous substances, or difficulty in managing mass-production processes, unlike conventional methods for joining different materials. In addition, it is possible to minimize the number of process steps, thereby improving the efficiency of production of the joined body of different materials and effectively reducing production cost.

In addition, an exemplary embodiment of the present invention provides a joined body of different materials including: a metal substrate including two or more etched grooves on a surface thereof and burrs provided adjacent to the etched grooves; and a first resin layer and a second resin layer sequentially laminated on the surface of the metal substrate, wherein the first resin layer has a light transmittance of 20% to 70% at any one wavelength selected from the range of 800 nm to 1,100 nm, and the light transmittance of the first resin layer at the wavelength selected from the range of 800 nm to 1,100 nm is lower than the light transmittance of the second resin layer at the same wavelength.

The joined body of different materials according to an exemplary embodiment of the present invention may have excellent bonding strength between the metal substrate and the first resin layer and excellent bonding strength between the first resin layer and the second resin layer.

The joined body of different materials according to an exemplary embodiment of the present invention may be produced by the above-described method for producing a joined body of different materials. In addition, the metal substrate, first resin layer and second resin layer of the joined body of different materials according to an exemplary embodiment of the present invention may be the same as the metal substrate, first resin layer and second resin layer used in the above-described method for producing a joined body of different materials, respectively.

According to an exemplary embodiment of the present invention, the first resin layer may fill the inside of the etched grooves and between the metal substrate surface and the burrs, and thus may be joined to the metal substrate. Specifically, as the melted portion of the first resin layer that is in contact with the surface of the metal substrate is supplied to and fills the surface of the metal substrate, the etched grooves and the inner space of the fence-shaped burrs, the first resin layer may be joined to the surface of the metal substrate.

According to an exemplary embodiment of the present invention, the first resin layer and the second resin layer may be fused and joined to each other. Specifically, as the interface between the first resin layer and the second resin layer is melted and fused by the heat energy generated in the first resin layer, the first resin layer and the second resin layer may be joined together.

According to an exemplary embodiment of the present invention, the thickness of the first resin layer may be 0.1 mm to 5 mm. For a conventional joined body of different materials, a tackifier, an adhesive or the like is used for joining between a resin layer and a metal substrate. In this case, the tackifier or adhesive has a thickness of nanometers to micrometers, and merely serves to join the resin layer to the metal substrate, but does not constitute a component of the joined body of different materials. On the contrary, as the first resin layer of the joined body of different materials according to an exemplary embodiment of the present invention has the above-described thickness, it may serve to join the second resin layer to the metal substrate, and at the same time, may constitute a component of the joined body of different materials.

According to an exemplary embodiment of the present invention, the thickness of the metal substrate may be 0.1 mm or more. In addition, the thickness of the second resin layer may be 0.1 mm to 5 mm.

Hereinafter, the present invention will be described in detail with reference to examples. However, the examples according to the present invention may be modified into various different forms, and the scope of the present invention is not interpreted as being limited to the examples described below. The examples of the present specification are provided to more completely explain the present invention to those skilled in the art.

Example 1

Preparation of Metal Substrate

The surface of a steel substrate having a thickness of 1.5 mm was etched to form a lattice structure by irradiating the surface in duplicate with two kinds of pulse lasers under the conditions shown in Table 1 below so that the lasers intersect at right angles. Through laser irradiation, etched grooves and burrs generated during the etching were connected to each other along the periphery of the etched grooves, thereby forming fence shapes, each having a space therein.

TABLE 1

| | Pulse width (ns) | Spot size (μm) | Output (W) | Repletion frequency (kHz) | Scanning speed (mm/s) | Peak output (kW) | Energy density (kJ/cm²) | Number of irradiations |
|---|---|---|---|---|---|---|---|---|
| Example 1 | 220 | 35 | 30 | 40 | 200 | 3.2 | 73 | 1 |

The average depth, inlet width and middle width of the etched grooves formed as described above were measured, and the results of the measurement are shown in Table 2 below. Specifically, in order to measure the average depth, inlet width and middle width of the etched grooves and the average depth and height of the burrs, the etched aluminum substrate was cut in the vertical direction of the interface portion and polished, thereby preparing specimens. In addition, the average value of the measured values of the respective features (depths of the etched grooves, the inlet widths of the etched grooves, the middle widths of the etched grooves, the lengths of the burrs, and the heights of the burrs) in 10 to 20 grooves for each specimen were calculated, and the results of the calculation are shown in Table 2 below.

TABLE 2

| | Depth (μm) of etched groove | Inlet width (μm) of etched groove | Middle width (μm) of etched groove | Length (μm) of burr | Height (μm) of burr |
|---|---|---|---|---|---|
| Example 1 | 80 | 12 | 25 | 45 | 35 |

At this time, the surface of the prepared steel substrate having the etched grooves and the burrs had a light reflectance of about 21% at a wavelength of 915 nm.

Production of Joined Body of Different Materials

As a first resin layer, a homopolypropylene resin layer having a thickness of about 1.6 mm was prepared, which had a light transmittance of about 59% and a light absorption rate of about 30% at a wavelength of 915 nm and to which about 30 wt % of glass fiber was added. In addition, as a second resin layer, an ethylene-propylene block copolymer resin (CB5230) substrate having a thickness of about 3.2 mm was prepared, which had a light transmittance of about 72% at a wavelength of 915 nm.

Next, the prepared steel substrate, first resin layer and second resin layer were each cut to a size of 20 mm (width)×60 mm (length), and then the first resin layer and the second resin layer were fixed onto the surface of the etched steel substrate so as to have an overlap length of 1 cm, thereby preparing a laminate including the steel substrate, the first resin layer and the second resin layer sequentially. Next, a diode laser having a wavelength of 915 nm, a spot size of 3 mm and an output of 450 W was repeatedly irradiated twice to the laminate (in the width direction of the laminate) at an irradiation speed of 40 mm/s in the direction from the second resin layer to the steel substrate, thereby producing a joined body of different materials.

Example 2

A joined body of different materials was produced in the same manner as Example 1, except that as the first resin layer, a homopolypropylene resin layer having a thickness of about 3.2 mm was prepared, which had a light transmittance of about 35% and a light absorption rate of about 50% at a wavelength of 915 nm and to which about 30 wt % of glass fiber was added.

Comparative Example 1

A joined body of different materials was produced in the same manner as Example 1, except that a steel substrate (having a light reflectance of about 52% at a wavelength of 915 nm) was prepared, which does not have etched grooves and burrs which are formed by laser irradiation, and as the first resin layer, a homopolypropylene resin layer having a thickness of about 1.6 mm was prepared, which had a light transmittance of about 35% and a light absorption rate of about 50% at a wavelength of 915 nm and to which about 30 wt % of glass fiber was added.

Comparative Example 2

A joined body of different materials was produced in the same manner as Comparative Example 1, except that a laser-absorbing resin having a light reflectance of about 5% at a wavelength of 915 nm was prepared instead of the steel substrate.

Comparative Example 3

A joined body of different materials was produced in the same manner as Example 1, except that as the first resin layer, a homopolypropylene resin layer having a thickness of about 1.6 mm was prepared, which had a light transmittance of about 72% and a light absorption rate of about 15% at a wavelength of 915 nm, and as the second resin layer, a homopolypropylene resin layer having a thickness of about 3.2 mm was prepared, which had a light transmittance of about 35% at a wavelength of 915 nm and to which about 30 wt % of glass fiber was added.

Comparative Example 4

A joined body of different materials was produced in the same manner as Example 1, except that as the first resin layer, a homopolypropylene resin layer having a thickness of about 3.2 mm was prepared, which had a light transmittance of about 80% and a light absorption rate of about 10% at a wavelength of 915 nm, and as the second resin layer, a homopolypropylene substrate having a thickness of about 1.6 mm was prepared, which had a light transmittance of about 72% at a wavelength of 915 nm.

Figure 4A:
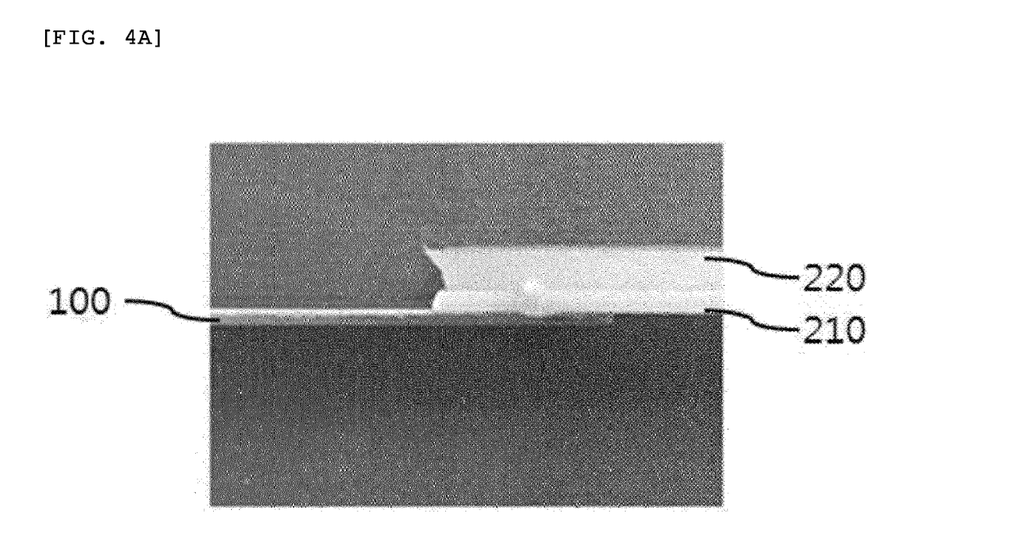
FIG. 4A is a photograph of a lateral surface and FIG. 4B is a photograph of top surface of a joined body of different materials produced in Example 1 of the present invention.
Figure 4B:
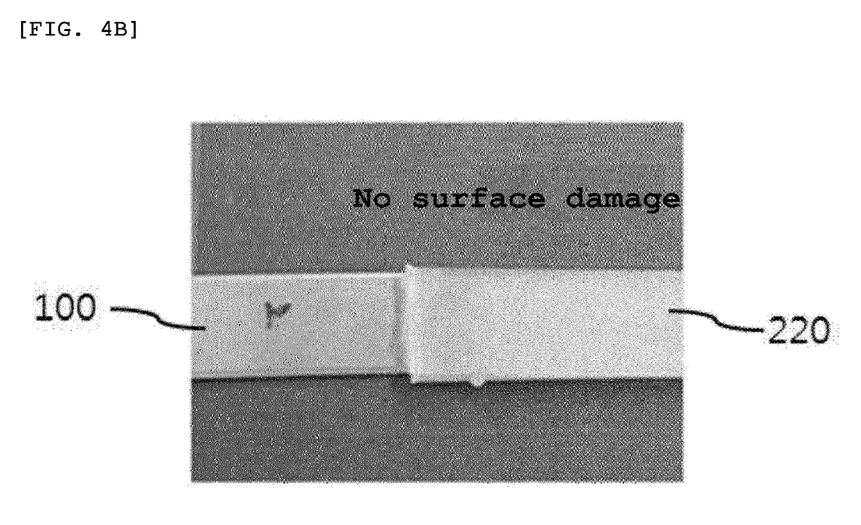
Figure 4C:
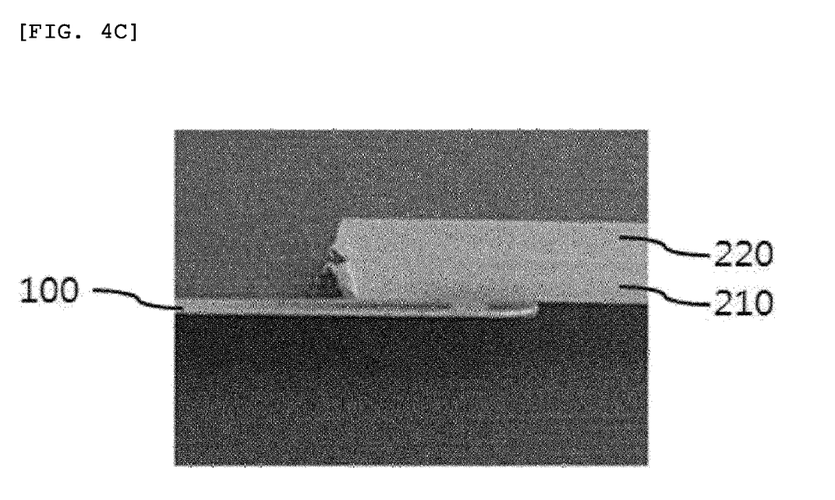
FIG. 4C is a photograph of a joined body of different materials produced in Example 2 of the present invention.

FIGS. 4A and 4B are photographs of the joined body of different materials produced in Example 1 of the present invention, and FIG. 4C is a photograph of the joined body of different materials produced in Example 2 of the present invention. Specifically, FIG. 4A is a photograph of the lateral side of the joined body of different materials produced in Example 1, and FIG. 4B is a photograph of the top surface of the joined body of different materials produced in Example 1.

As shown in FIGS. 4A to 4C, the methods for producing a joined body of different materials according to Examples 1 and 2 of the present invention could effectively join the metal substrate and the first resin layer and join the first resin layer and the second resin layer at the same time. In addition, as shown in FIG. 4B, the surface of the second resin layer irradiated with the laser was not damaged.

Figure 5A:
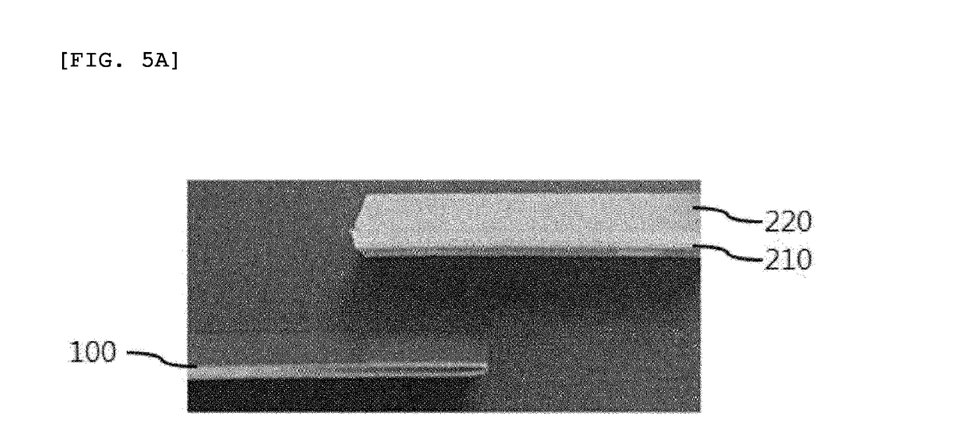
FIG. 5A is a photograph of a joined body of different materials produced in Comparative Example 1.
Figure 5B:
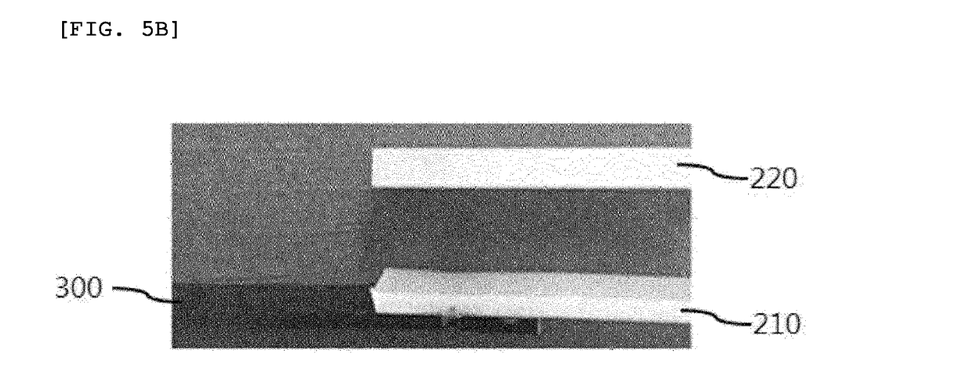
FIG. 5B is a photograph of a joined body of different materials produced in Comparative Example 2.
Figure 5C:
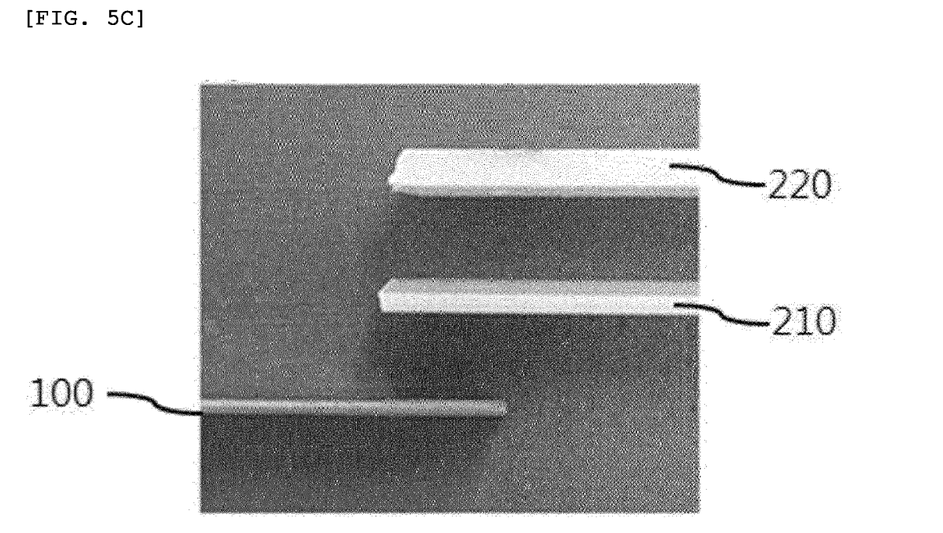
FIG. 5C is a photograph of a lateral surface of a joined body of different materials produced in Comparative Example 3.
Figure 5D:
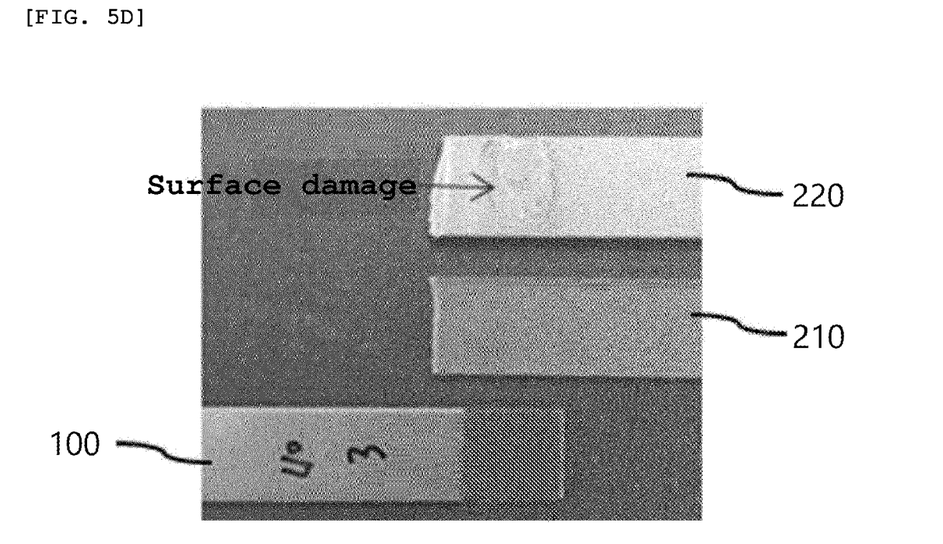
FIG. 5D is a photograph of a top surface of a joined body of different materials produced in Comparative Example 3.
Figure 5E:
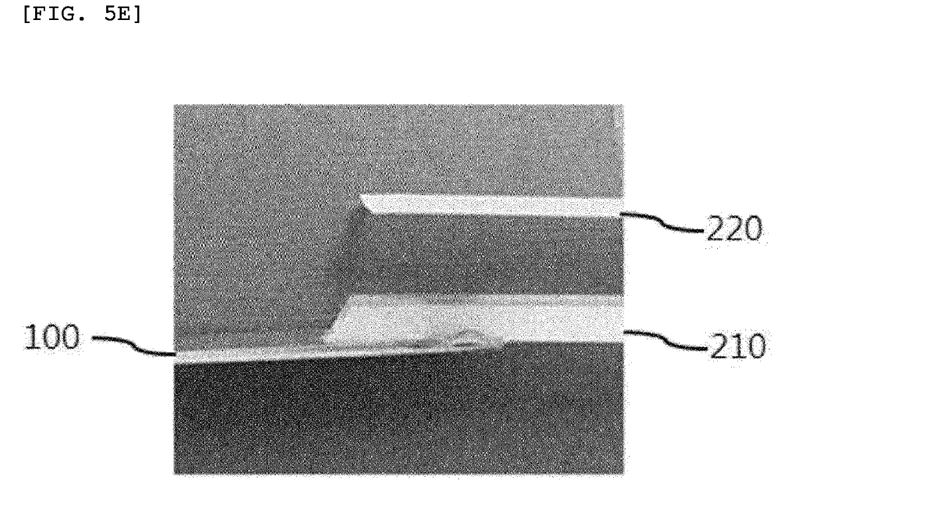
FIG. 5E is photograph of the joined body of different materials produced in Comparative Example 4.

FIG. 5A is a photograph of the joined body of different materials produced in Comparative Example 1; FIG. 5B is a photograph of the joined body of different materials produced in Comparative Example 2; FIGS. 5C and 5D are photographs of the joined body of different materials produced in Comparative Example 3; and FIG. 5E is a photograph of the joined body of different materials produced in Comparative Example 4. Specifically, FIG. 5C is a photograph of the lateral side of the joined body of different materials produced in Comparative Example 3, and FIG. 5D is a photograph of the top surface of the joined body of different materials produced in Comparative Example 3.

As shown in FIG. 5A, in Comparative Example 1, in which anchoring grooves and burrs were not formed on the surface of the metal substrate, the first resin layer and the second resin layer are joined, but the metal substrate and the first resin layer were not joined. In addition, as shown in FIG. 5B, in Comparative Example 2, in which the laser-absorbing resin having a surface light reflectance of about 5% was used as the substrate, the metal substrate and the first resin layer were joined, but energy transferred from the substrate to the first resin layer by reflection was not sufficient. Hence, the first resin layer and the second resin layer were not joined.

In addition, as shown in FIG. 5C, in Comparative Example 3, in which the light transmittance and light absorption rate of the first resin layer and the light transmittance of the second resin layer were out of the ranges specified in the present invention and the light transmittance of the second resin layer was lower than the light transmittance of the first resin layer, most of the energy of the laser irradiated was concentrated at the second resin layer and the energy was not sufficiently transferred to the first resin layer and the metal substrate through the second resin layer. Hence, neither the metal substrate and the first resin layer nor the first resin layer and the second resin layer were joined. In addition, as shown in FIG. 5D, most of the energy generated during irradiation of the laminate with the laser was concentrated at the second resin layer. Hence, the surface of the second resin layer was damaged.

Furthermore, as shown in FIG. 5E, in Comparative Example 4, in which the light transmittance of the first resin layer was higher than 70% and the light transmittance of the second resin layer was 72%, the laser sufficiently reached the metal substrate, and the metal substrate and the first resin layer were joined, but the first resin layer did not sufficiently absorb energy due to its high light transmittance. Hence, the first resin layer was not joined to the second resin layer.

Test Example 1

Both ends of each of the joined bodies of different materials produced in Examples 1 and 2 and Comparative Examples 1 to 4 were fixed to a Zwick universal testing machine (model: Z020), and the bonding strength of each joined body was measured by measuring the shear tensile strength using the machine at a speed of 50 mm/min.

The bonding strength was measured by measuring the shear tensile strength according to Test Example 1 above, and as a result, it was confirmed that Example 1 had a bonding strength of 23 MPa, and Example 2 had a bonding strength of 22 MPa. Furthermore, during the measurement of the shear tensile strengths of Examples 1 and 2, the interface between the metal and the plastic was broken, and no separation between the first resin layer and the second resin layer occurred.

In comparison with this, in the case of Comparative Examples 1 and 3, joining between the steel substrate and the first resin layer was not achieved during the production of the joined body of different materials. In the case of Comparative Example 2, joining between the laser-absorbing resin and the first resin layer occurred, but joining between the first resin layer and the second resin layer did not occur. In addition, in the case of Comparative Example 4, only joining between the steel substrate and the first resin layer occurred, but joining between the first resin layer and the second resin layer did not occur. Hence, it was impossible to measure the bonding strengths of the joined bodies of different materials, which are Comparative Examples 1 to 4.

DESCRIPTION OF REFERENCE NUMERALS

10: etched grooves
20, 20a, 20b, 20c and 20d: burrs
30: surface area
100: metal substrate
210: first resin layer
220: second resin layer
300: laser-absorbing resin

The invention claimed is:
1. A method for producing a joined body comprising different materials joined together, the method comprising the steps of:
  preparing a metal substrate comprising two or more etched grooves on a surface thereof and burrs provided adjacent to each of the two or more etched grooves;
  sequentially placing a first resin layer and a second resin layer on the surface of the metal substrate; and
  irradiating a surface of the second resin layer with a laser, thereby fusing the first and second resin layers to form a laminate,
  wherein the first resin layer has a light transmittance of 20% to 70% at any one wavelength selected from a range of 800 nm to 1,100 nm,
  wherein the second resin layer has a light transmittance of 50% to 80% at the any one wavelength,
  wherein the surface of the metal substrate has a light reflectance of 50% or less at the any one wavelength,
  wherein a light absorption rate of the first resin layer at the any one wavelength selected from a range of 800 nm to 1,100 nm is 20% to 50%, and
  wherein the light transmittance of the first resin layer at the any one wavelength is lower than a light transmittance of the second resin layer at the any one wavelength.

2. The method of claim 1, wherein the light transmittance of the first resin layer at the any one wavelength is 20% to 50%.

3. The method of claim 1, wherein the first resin layer has a thickness of 0.1 mm to 5 mm.

4. The method of claim 1, wherein the laser is a diode laser having an output of 50 W to 2,000 W.

5. The method of claim 1, wherein the surface of the second resin layer is irradiated with the laser three times or less at an irradiation speed of 10 mm/s to 1,000 mm/s, and wherein the laser has a spot size of 100 μm to 5,000 μm.

* * * * *